(12) United States Patent
Li et al.

(10) Patent No.: US 7,840,677 B2
(45) Date of Patent: Nov. 23, 2010

(54) SYSTEMS, METHODS AND COMPUTER PROGRAM PRODUCTS FOR IMPROVING PLACEMENT PERFORMANCE OF MESSAGE TRANSFORMS BY EXPLOITING GUIDED REPLICATION

(75) Inventors: Ying Li, Mohegan Lake, NY (US); Robert Evan Strom, Ridgefield, CT (US)

(73) Assignee: International Business Machines Corporation, Armonk, NY (US)

( * ) Notice: Subject to any disclaimer, the term of this patent is extended or adjusted under 35 U.S.C. 154(b) by 267 days.

(21) Appl. No.: 12/046,262

(22) Filed: Mar. 11, 2008

(65) Prior Publication Data

US 2009/0235251 A1 Sep. 17, 2009

(51) Int. Cl.
G06F 15/173 (2006.01)
(52) U.S. Cl. ........................ 709/226; 709/223; 709/238; 718/100; 718/105
(58) Field of Classification Search .................. 709/200, 709/223, 225–226, 201–203, 238; 718/100, 718/105
See application file for complete search history.

(56) References Cited

U.S. PATENT DOCUMENTS

| | | | |
|---|---|---|---|
| 6,374,367 B1 * | 4/2002 | Dean et al. ........... | 714/37 |
| 2001/0037409 A1 * | 11/2001 | Ricciulli .............. | 709/310 |
| 2005/0027817 A1 | 2/2005 | Novik et al. | |
| 2005/0203919 A1 | 9/2005 | Deutsch et al. | |
| 2005/0268300 A1 | 12/2005 | Lamb et al. | |
| 2006/0087986 A1 * | 4/2006 | Dube et al. .......... | 370/255 |
| 2006/0224668 A1 * | 10/2006 | Ginis ................. | 709/204 |
| 2007/0022129 A1 | 1/2007 | Bahar et al. | |
| 2007/0174233 A1 | 7/2007 | Ginis et al. | |
| 2007/0262650 A1 | 11/2007 | Li | |

* cited by examiner

*Primary Examiner*—Faruk Hamza
(74) *Attorney, Agent, or Firm*—Cantor Colburn LLP; Preston Young

(57) ABSTRACT

Systems, methods and computer program products for optimizing an objective function (e.g. the overall end-to-end runtime latency) of a flow graph of message transformations which are placed onto an overlay network of broker machines by replicating stateless transformations in a guided manner. Exemplary embodiments include a guided replication method, including given an initial transformation graph and a network topology, running a placement algorithm to obtain top N best task-to-broker assignments, identifying the R-task which forms the performance bottleneck, checking if the objective function improvement drops below a designated threshold, if yes, then selecting the optimal task-to-broker assignment and the program terminates; otherwise, replicating the R-task, optimally distributing the data load among R-task's replicas, deriving a set of starting points from the above obtained top N task-to-broker assignments, and re-executing the placement algorithm with these starting points in an iterative fashion.

5 Claims, 6 Drawing Sheets

SYSTEMS, METHODS AND COMPUTER PROGRAM PRODUCTS FOR IMPROVING PLACEMENT PERFORMANCE OF MESSAGE TRANSFORMS BY EXPLOITING GUIDED REPLICATION

TRADEMARKS

IBM® is a registered trademark of International Business Machines Corporation, Armonk, N.Y., U.S.A. Other names used herein may be registered trademarks, trademarks or product names of International Business Machines Corporation or other companies.

BACKGROUND OF THE INVENTION

1. Field of the Invention

This invention relates to event stream processing, and particularly to systems, methods and computer program products for improving both the efficiency of placement of message transformations, and the efficiency of the resulting deployment by exploiting guided replication.

2. Description of Background

Currently, it is a continuing challenge to placing computational components of an event stream processing application onto a network of servers. (The computational components are sometimes also called "tasks", "mediations", or "(stream) transformations"; and the servers are sometimes also called "brokers".)

SUMMARY OF THE INVENTION

Exemplary embodiments include a method for optimizing an objective function (e.g. the overall end-to-end runtime latency) of a flow graph of message transformations which are placed onto an overlay network of broker machines by replicating stateless transformations in a guided manner, the method including given an initial transformation graph, a network topology, and expected performance properties of the transformation graph and of the network nodes and links, and a designation of particular stateless transformations in the transformation graph as being replicable, running a placement algorithm to obtain top N best task-to-broker assignments, identifying the R-task which forms the performance bottleneck, checking if the objective function improvement drops below a designated threshold, if yes, then selecting the optimal task-to-broker assignment and the program terminates; otherwise, replicating the R-task, optimally distributing the data load among R-task's replicas, deriving a set of starting points from the above obtained top N task-to-broker assignments, and re-executing the placement algorithm with these starting points in an iterative fashion.

The embodiments described herein build upon U.S. patent application Ser. No. 11/943,150, filed Nov. 20, 2007, and entitled an earlier filed disclosure within this research group: "SYSTEMS, METHODS AND COMPUTER PROGRAM PRODUCTS FOR IMPROVING PLACEMENT PERFORMANCE OF MESSAGE TRANSFORMS BY EXPLOITING AGGRESSIVE REPLICATION", referred to as the "early invention" hereinafter. The early invention is further built upon an earlier patented invention within this group: "METHODS AND APPARATUS FOR EFFICIENTLY PLACING STREAM TRANSFORMS AMONG BROKER MACHINES COMPRISING AN OVERLAY NETWORK IN A PUBLISH-SUBSCRIBE MESSAGING SYSTEM", US Patent Publication 20060224668, referred to as the "foundational invention" hereinafter.

System and computer program products corresponding to the above-summarized methods are also described and claimed herein.

Additional features and advantages are realized through the techniques of the present invention. Other embodiments and aspects of the invention are described in detail herein and are considered a part of the claimed invention. For a better understanding of the invention with advantages and features, refer to the description and to the drawings.

TECHNICAL EFFECTS

As a result of the summarized invention, technically we have achieved a solution which provides a replication mechanism that is flexible and intelligent in the sense that it chooses the best transformation to replicate at each iterative step, assigns optimal load weights among its replicas, and derives the set of starting points for re-executing the placement algorithm from the set of top N best task-to-broker assignments achieved from the previous placement execution. As a summary, as the guided replication mechanism described in this invention runs multiple executions of optimization where the next run starts from points near the optimal solutions found in the previous run, efficiency of placing the message transformations will be steadily improved.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

Figure 1A:
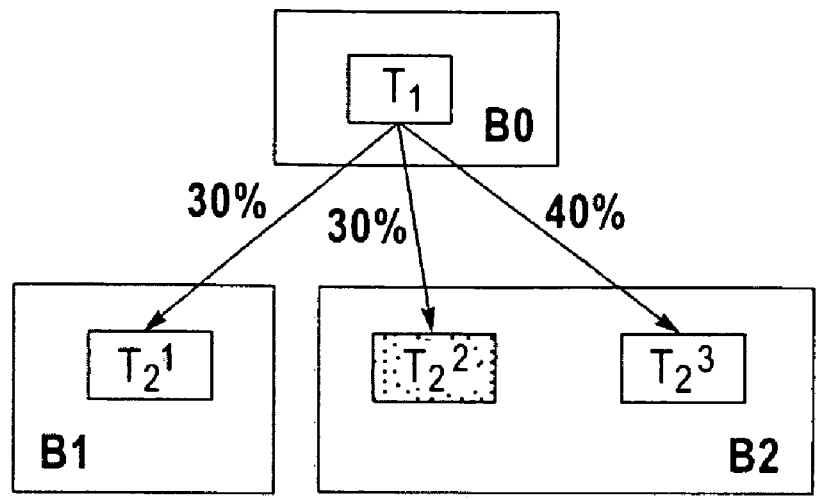
FIG. 1A illustrates a portion of an optimal task-to-broker assignment in accordance with exemplary embodiments.

The detailed description explains the preferred embodiments of the invention, together with advantages and features, by way of example with reference to the drawings.

DETAILED DESCRIPTION OF THE INVENTION

In the early invention, given a message transformation graph consisting of a set of stateful and stateless transformations, each stateless transformation is replicated with a predetermined number of replicas with each replica being assigned a pre-determined percentage of loads. Moreover, as there is no way to know that replicating transformation A will result in a better system performance than replicating transformation B, thus all stateless transformations are replicated at the same time. As a result, if the placement result is not satisfactory, the algorithm needs to be re-run from scratch with a different set of configuration.

In exemplary embodiments, the guided replication systems and methods described herein: 1) run multiple executions of the optimization where the next run starts from points near the optimal solutions found in the previous run (i.e., the next run builds upon the previous run); 2) identify the transformation that forms the performance bottleneck at each run; and 3) automatically perform replication on the identified bottleneck transformation, and intelligently determine the optimal load distribution among its replicas. Such execution is iterated until the marginal benefit of more refined replication decreases below a threshold.

In exemplary embodiments, the systems and methods described herein are provided with the flexibility and intelligence in deciding which transformation to replicate at each run, and with what load distribution ratio. The best solutions to each execution of the optimization algorithm are used to generate starting points for the next, more refined execution of the optimization algorithm. Moreover, with each iteration, the performance is steadily improved, and fluctuation is decreased as compared to the aggressive replication approach described in the early invention. As a result, a more refined solution using less computation and with more focused search spaces is achieved.

In exemplary embodiments, the systems and methods described herein do not assume any prior knowledge about the transformations that need to be replicated in order to achieve an optimal placement. Instead, they are automatically determined based on the placement result obtained from an earlier run. Moreover, once a transformation is chosen to be replicated, the load distribution among its replicas is also automatically determined on the fly. Consequently, an automated replication which leads to an optimal system performance in terms of a given objective function is achieved.

The guided replication approach is now illustrated in an iterative step which contains two sub-steps: Step k.(1) and Step k.(2) starting with k=1. As discussed herein, the system performance with guided replication is improved in an iterative fashion such that Step k's optimal solutions are always included in the solution space of Step k+1. As a result, the system performance is consistently improved.

For sub-step k.(1), given an initial transformation graph, a network topology consisting of an overlay network of broker machines, and expected performance properties of the transformation graph and of the network nodes and links, and a designation of particular stateless transformations in the transformation graph as being replicable, a task replication is performed using the following two pieces of information: a) the number of replicas for each replicable transformation T, which is stored in a hash map; and (b) detailed load distribution information among T's replicas. Both of these two information pieces are collected from the previous step, except that the hash map in (a) is set to empty when k=1, i.e. no replication is performed when k=1. Such replication converts the initial transformation graph into an enhanced graph. Then, with the enhanced flow graph, the placement algorithm (as described in the foundational invention) is run to obtain top N best task-to-broker assignments. In exemplary embodiments, the set of random starting points used for running the placement algorithm are either randomly generated when k=1, or derived from the optimal solutions obtained from the previous run as detailed later.

FIG. 1A shows an example of a top best task-to-broker assignment $\pi_{best}$, (only a portion of the graph is displayed here), where task $T_1$ has been replicated into $T_2^1$, $T_2^2$ and $T_2^3$. Moreover, they are assigned to two brokers, $B_1$ and $B_2$, and the load distribution among them is 30%, 30% and 40%, respectively.

Taking the top best placement assignment $\pi_{best}$, its objective function (e.g., the overall end-to-end runtime latency) is then compared with that of the last run. Theoretically, the objective function should be consistently improving, yet it is observed that such improvement gradually converges. Therefore, the iterative process ceases once the objective function improvement drops below a designated threshold.

Otherwise, the transformation which is most sensitive to move is identified. It is denoted by R-task. Particularly, for every replicable transformation in the enhanced transformation graph, the systems and methods described herein try replacing it to a different broker other than the one it is being assigned in $\pi_{best}$, and quantify the extra end-to-end latency brought by such suboptimal placement. The R-task is then identified to be the one whose replacement incurs the largest extra delay. In another word, the R-task's best move has the worst effect. This could potentially mean that the R-task is a performance bottleneck. Thus it is considered as the replication candidate for the next step.

Figure 1B:
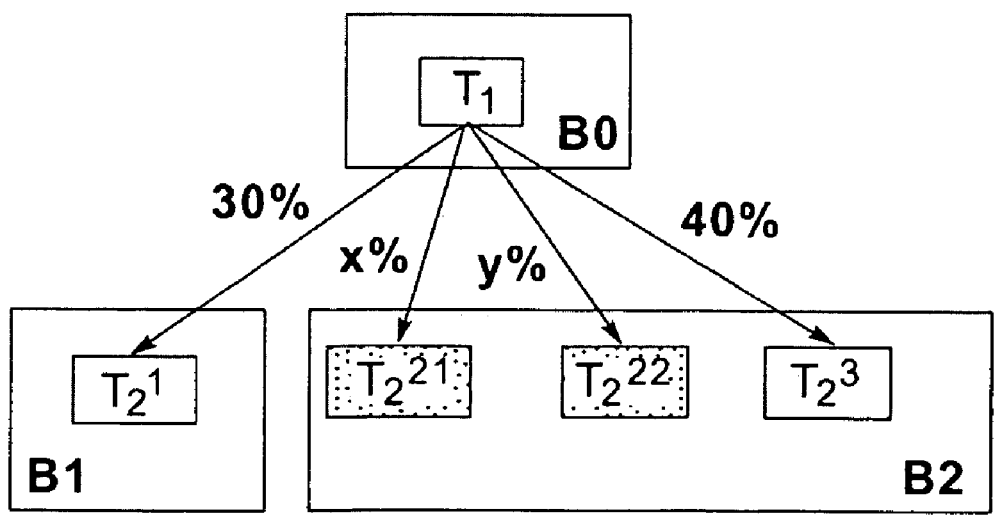
FIG. 1B illustrates a possible placement assignment after replicating $T_2^2$, the identified R-task in FIG. 1A, in accordance with exemplary embodiments.

In sub-step k.(2), the systems and methods described herein first attempt to replicate the R-task as identified from the previous step, into two copies. Assume that $T_2^2$ in FIG. 1A is identified as the R-task, then it is replicated into two copies $T_2^{21}$ and $T_2^{22}$, as shown in FIG. 1B. In exemplary embodiments, both of these two copies are assigned to the same broker $B_2$. When the R-task has more than one children nodes, replicating it involves the replication of its children nodes as well. However, for purposes of the example, the R-task is assumed to have only one child.

In exemplary embodiments, the load among $T_2^{21}$ and $T_2^{22}$ is partitioned according to a rule applied to determine the values for x and y in FIG. 1B. In addition, a metric can be implemented to measure the goodness of such load distribution, which satisfies the condition "x+y=30". In exemplary embodiments, the systems and methods described herein measure such goodness in terms of the coverage capability possessed by a certain load distribution.

To generalize such optimization problem, assume that there are m replicas who are assigned to b brokers and whose load weights add up to 100, Now, a set of m+1 replicas need to be obtained which are derived from the m replicas, are assigned to the same b brokers, and whose load weights also add up to 100. In exemplary embodiments, the approach is detailed to measure the coverage capability of the load weights of such m+1 replicas. Denote such set of load weights by $\omega$.

In exemplary embodiments, all possible sets of b non-negative integers are enumerated, where numbers in each such set add up to 100. These sets are denoted by $\Phi=\{\phi_1, \ldots, \phi_P\}$, where $\phi_i=\{I_1, \ldots, I_b\}$, $I_j \geq 0$ and $\Sigma^b_{j=1} I_j=100$. In the context of placement problem, these P data sets can be viewed as P different ways of distributing load among b brokers that would be possible after running the next round of placement. In FIG. 1B, as an example, the data outflowing from $T_1$ are influx into two brokers, resulting in 51 different ways of partitioning the load among them: [0, 100] (which means that $B_2$ gets all the load), [1, 99], [2, 98], all the way to [50, 50] (which means that the two brokers equally share the load).

In exemplary embodiments, the capability of ω's achieving the target load distribution as specified by $\phi_i$ is measured. It is denoted by $c(\omega, \phi_i)$. In exemplary embodiments, it is calculated as follows. First, all possible ways of assigning the m+1 replicas as specified in ω to the b brokers are enumerated, and each of the resulted load distributions (denote it by ψ) is documented. Then, the assignment whose ψ is closest to $\phi_i$ in the sense that the SMD (sum of mean squared difference) between them (i.e., $\text{sqrt}(\Sigma^b_{j=1}(\psi^j - \phi^j_i)^2)$) is identified. In exemplary embodiments, $c(\omega, \phi_i)$ is set to be the inverse of the smallest SMD.

In exemplary embodiments, ω's overall capability with regard to the superset Φ is measured by summing up $c(\omega, \phi_i)$, i=1, ..., P. It is denoted by $C(\omega)$. Thus $C(\omega) = \Sigma^P_{i=1} c(\omega, \phi_i)$. In exemplary embodiments, the larger the $C(\omega)$, the higher the capability that ω is able to reach various load distribution targets in Φ that would be possible after running the next round of placement.

In exemplary embodiments, $\Omega(\Omega = \{\omega_1, \ldots, \omega_A\})$ is denoted as the super-set which contains all possible sets of m+1 numbers that meet the conditions listed in paragraph [0033], the normalized coverage capability of each $\omega_i$ is calculated as:

coverage($\omega_i$)=$C(\omega_i)/\Sigma^A_{j=1} C(\omega_j)$

As such, $\omega_i$'s normalized coverage capability is measured to predict if it is capable to cover various load distribution cases (including the optimal case) that would be possible after the next round of placement. Generally, the larger the rate, the higher its capability, and the more possible that such $\omega_i$ will lead to an optimal assignment in the next run.

In exemplary embodiments, the set of random starting points for running the next-round placement algorithm is derived from the top N assignment ($\pi_k$) obtained at the previous run. Specifically, each such assignment $\pi_k$ is expanded into $\pi_{k+1}$ such that the R-task is replicated and its replicas are assigned to the same broker as R-task's. This way, as the workload on each broker remains the same, such $\pi_{k+1}$ is functionally equivalent to $\pi_k$ in the sense that it leads to the same end-to-end latency (or, within a small range of ε if artifacts such as serialization cost are taken into account).

In exemplary embodiments, after the N expanded assignments are obtained, the potential solution space is expanded by performing R times data perturbation on each $\pi_{k+1}$. As a result, N*R different $\pi_{k+1}$ are available at this stage, which will be used as the set of starting points for running the next round of placement algorithm. As such, the optimal solutions achieved from the previous run are included into the solution space of the next run, thus a more refined solution within a more focused search space using less computation is reached.

In exemplary embodiments, k is increased by 1, and the two sub-steps in Step k are repeated.

Figure 2:
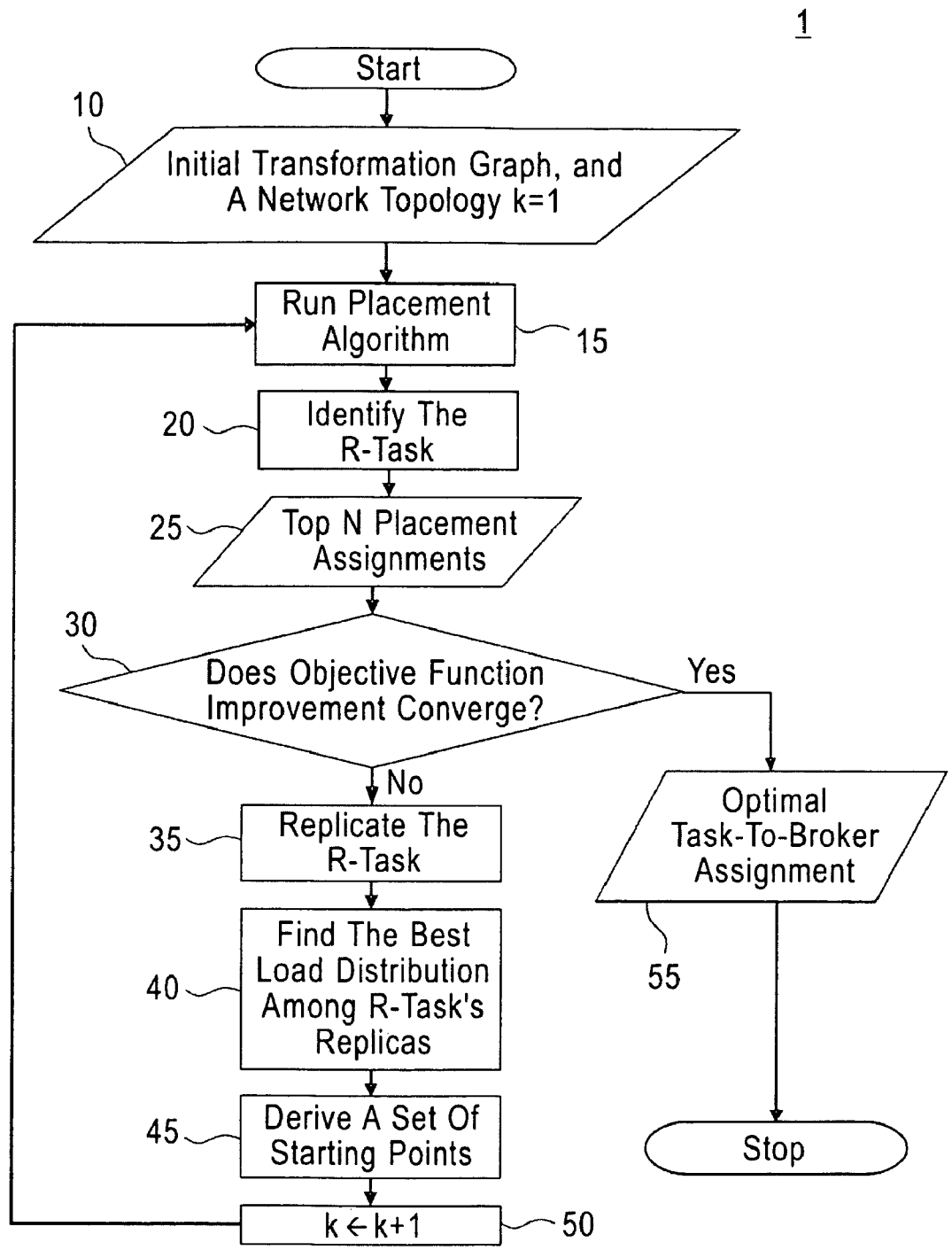
FIG. 2 illustrates a flow chart of the iterative process of the guided replication approach for achieving an optimal task-to-broker assignment with a given transformation graph and a network topology, in accordance with exemplary embodiments.

FIG. 2 illustrates a flow chart of such iterative process 1 of the guided replication approach for achieving the optimal task-to-broker assignment with a given transformation graph. At block 10, the initial transformation graph and a network topology are given, and the iteration index k is set to 1. At block 15, the placement algorithm as described in the foundational invention is run. At block 20, the R-task that forms the performance bottleneck is identified. At block 25, the top N best task-to-broker assignments are obtained. At block 30, it is determined whether or not the objective function improvement converges. If it does not converge, then at block 35, the R-task is replicated. At block 40, the optimal load distribution among R-task's replicas is calculated. At block 45, a set of starting points is derived from the above obtained top N placement assignments for running the next round of placement at block 15. At block 50, the iteration index k is increased by 1, and the whole process repeats from block 15 until the objective function improvement converges at block 30. If at block 30, there is a convergence, then at block 55, the optimal task-to-broker assignment is obtained, and the program terminates.

Examples of R-Task Replication

In a first example, the R-task has a single parent in the transformation graph. The R-task also has a single child which is either a non-replicable transformation or a replicable transformation but has not been replicated yet.

Figure 3A:
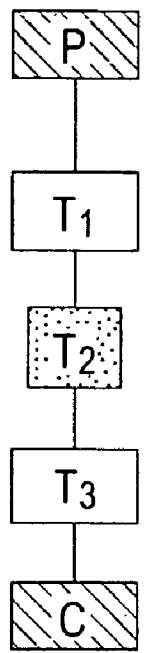
FIG. 3A illustrates an example of a transformation graph.
Figure 3B:
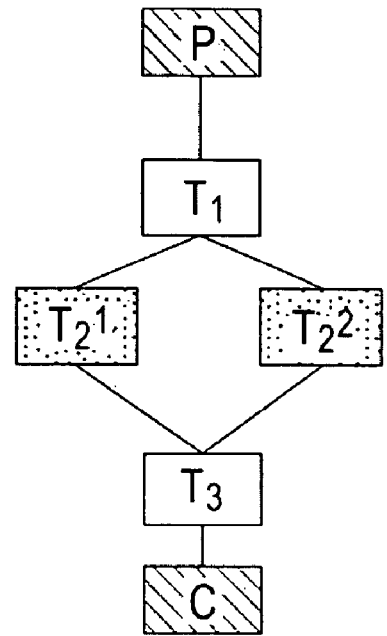
FIG. 3B illustrates an example of an augmented transformation graph of FIG. 3A after replicating $T_2$.
Figure 3C:
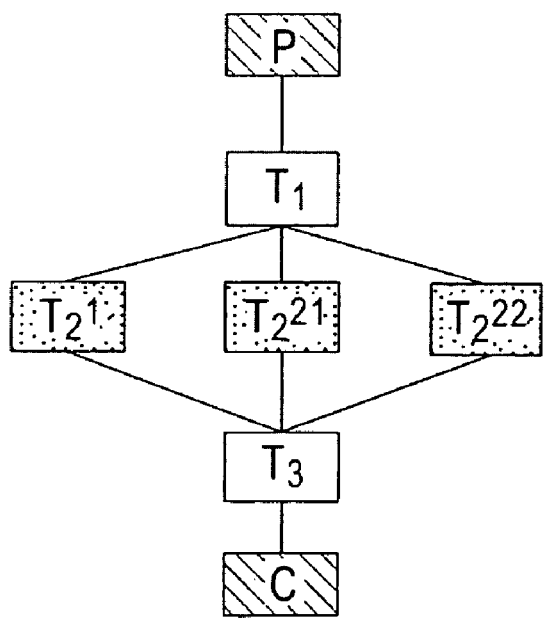
FIG. 3C illustrates an example of an augmented transformation graph of FIG. 3B after replication $T_2^2$.

FIG. 3A shows a transformation graph which may or may not be the initial transformation graph. If $T_2$ is identified as the R-task, then it is replicated into two copies which results in an enhanced transformation graph in FIG. 3B. If $T_2^2$ is the new R-task for the next round of replication, then following the same replication rule, a modified transformation graph is obtained as illustrated in FIG. 3C.

In a second example, an R-task has a single parent in the transformation graph, yet its child node or children nodes, are replicas of another replicable transformation.

Figure 4A:
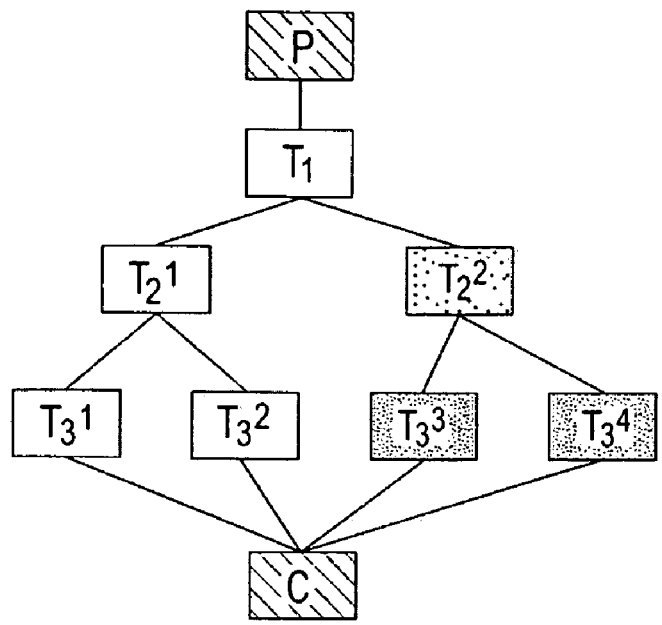
FIG. 4A illustrates an example of a transformation graph.
Figure 4B:
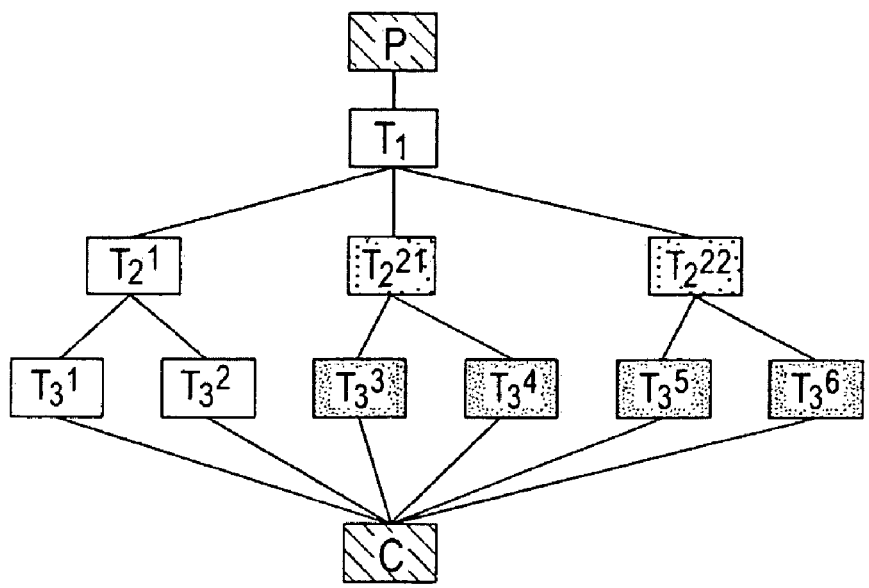
FIG. 4B illustrates an example of an augmented transformation graph of FIG. 4A after replicating $T_2^2$ and its children nodes.

FIG. 4A demonstrates such scenario where the R-task $T_2^2$ has two children nodes which are the replicas of another transformation $T_3$. In this case, when $T_2^2$ is replicated into $T_2^{21}$ and $T_2^{22}$ as shown in FIG. 4B, the same two children nodes should also be replicated (along with certain information such as the load distribution and their broker assignments) so as to obtain an equivalent placement assignment after the replication.

In a third example, the R-task has more than one parent in the task graph, and its child node or children nodes, are replicas of another replicable task.

Figure 5A:
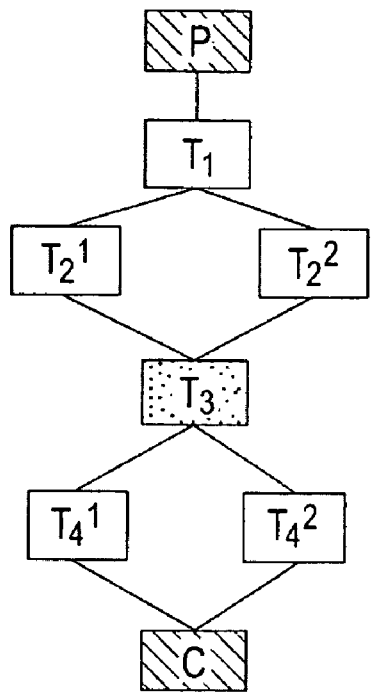
FIG. 5A illustrates an example of a transformation graph.
Figure 5B:
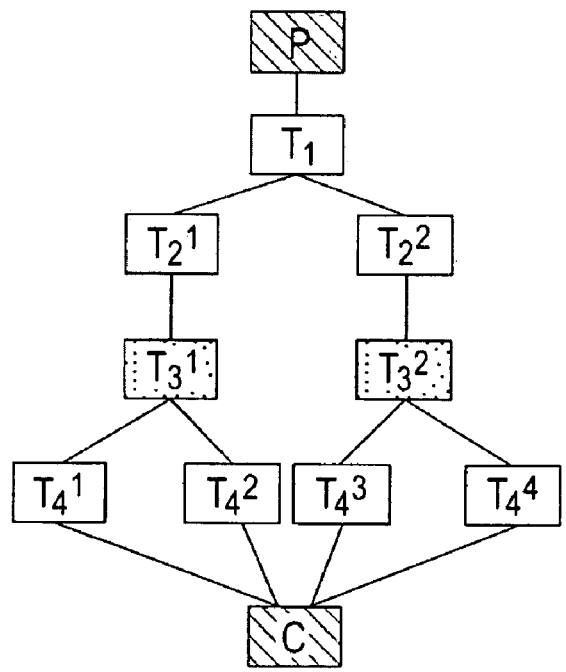
FIG. 5B illustrates an example of an augmented transformation graph of FIG. 5A after replicating $T_3$ and its children nodes.

FIGS. 5A and 5B demonstrate this third, also the most complex scenario where both of the R-task's parents and children are replicas of other transformation. A path replication with the R-task $T_3$ is performed instead of a combinatorial replication so as to reduce the complexity of the derived transformation graph. On the other hand, both of $T_3$'s previous children $T_4^1$ and $T_4^2$ are still copied over, which essentially suggests a combinatorial replication for task $T_4$.

Figure 6:
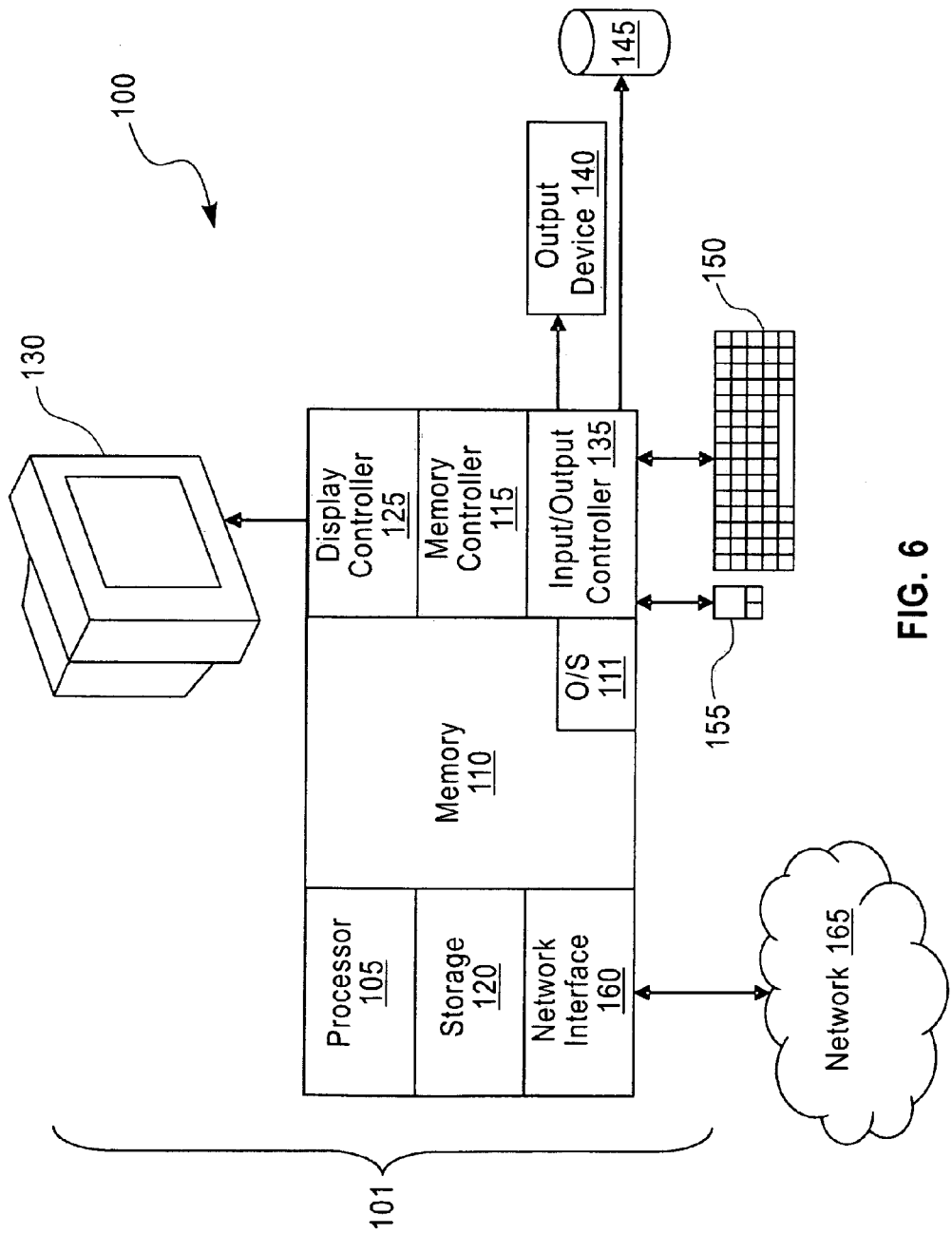
FIG. 6 illustrates an exemplary embodiment of a system for improving the efficiency of placing message transformations by exploiting guided replication.

FIG. 6 illustrates an exemplary embodiment of a system 100 for improving the efficiency of placing message transformations by exploiting guided replication. The methods described herein can be implemented in software (e.g., firmware), hardware, or a combination thereof. In exemplary embodiments, the methods described herein are implemented in software, as an executable program, and is executed by a special or general-purpose digital computer, such as a personal computer, workstation, minicomputer, or mainframe computer. The system 100 therefore includes general-purpose computer 101.

In exemplary embodiments, in terms of hardware architecture, as shown in FIG. 6, the computer 101 includes a processor 105, memory 110 coupled to a memory controller 115, and one or more input and/or output (I/O) devices 140, 145 (or peripherals) that are communicatively coupled via a local input/output controller 135. The input/output controller 135 can be, for example but not limited to, one or more buses or other wired or wireless connections, as is known in the art. The input/output controller 135 may have additional elements, which are omitted for simplicity, such as controllers, buffers (caches), drivers, repeaters, and receivers, to enable communications. Further, the local interface may include address, control, and/or data connections to enable appropriate communications among the aforementioned components.

The processor 105 is a hardware device for executing software, particularly that stored in memory 110. The processor 105 can be any custom made or commercially available processor, a central processing unit (CPU), an auxiliary processor among several processors associated with the computer 101, a semiconductor based microprocessor (in the form of a microchip or chip set), a macroprocessor, or generally any device for executing software instructions.

The memory 110 can include any one or combination of volatile memory elements (e.g., random access memory (RAM, such as DRAM, SRAM, SDRAM, etc.)) and nonvolatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 110 may incorporate electronic, magnetic, optical, and/or other types of storage media. Note that the memory 110 can have a distributed architecture, where various components are situated remote from one another, but can be accessed by the processor 105.

The software in memory 110 may include one or more separate programs, each of which comprises an ordered listing of executable instructions for implementing logical functions. In the example of FIG. 6, the software in the memory 110 includes the message transformation replication methods described herein in accordance with exemplary embodiments and a suitable operating system (O/S) 111. The operating system 111 essentially controls the execution of other computer programs, such as the message transformation replication systems and methods described herein, and provides scheduling, input-output control, file and data management, memory management, and communication control and related services.

The message transformation replication methods described herein may be in the form of a source program, executable program (object code), script, or any other entity comprising a set of instructions to be performed. When it is a source program, then the program needs to be translated via a compiler, assembler, interpreter, or the like, which may or may not be included within the memory 110, so as to operate properly in connection with the O/S 111. Furthermore, the message transformation replication methods can be written with an object oriented programming language, which has classes of data and methods, or a procedure programming language, which has routines, subroutines, and/or functions.

In exemplary embodiments, a conventional keyboard 150 and mouse 155 can be coupled to the input/output controller 135. The I/O devices 140, 145 may include devices, such as, but not limited to a printer, a scanner, microphone, and the like. Finally, the I/O devices 140, 145 may further include devices that communicate both inputs and outputs, for instance but not limited to, a NIC or modulator/demodulator (for accessing other files, devices, systems, or a network), a radio frequency (RF) or other transceiver, a telephonic interface, a bridge, a router, and the like. The system 100 can further include a display controller 125 coupled to a display 130. In exemplary embodiments, the system 100 can further include a network interface 160 for coupling to a network 165. The network 165 can be an IP-based network for communication between the computer 101 and any external server, client and the like via a broadband connection. The network 165 transmits and receives data between the computer 101 and external systems. In exemplary embodiments, network 165 can be a managed IP network administered by a service provider. The network 165 may be implemented in a wireless fashion, e.g., using wireless protocols and technologies, such as WiFi, WiMax, etc. The network 165 can also be a packet-switched network such as a local area network, wide area network, metropolitan area network, Internet network, or other similar type of network environment. The network 165 may be a fixed wireless network, a wireless local area network (LAN), a wireless wide area network (WAN), a personal area network (PAN), a virtual private network (VPN), intranet or other suitable network system and includes equipment for receiving and transmitting signals.

If the computer 101 is a PC, workstation, intelligent device or the like, the software in the memory 110 may further include a basic input output system (BIOS) (omitted for simplicity). The BIOS is a set of essential software routines that initialize and test hardware at startup, start the O/S 111, and support the transfer of data among the hardware devices. The BIOS is stored in ROM so that the BIOS can be executed when the computer 101 is activated.

When the computer 101 is in operation, the processor 105 is configured to execute software stored within the memory 110, to communicate data to and from the memory 110, and to generally control operations of the computer 101 pursuant to the software. The message transformation replication methods described herein and the O/S 111, in whole or in part, but typically the latter, are read by the processor 105, perhaps buffered within the processor 105, and then executed.

When the systems and methods described herein are implemented in software, as is shown in FIG. 6, the methods can be stored on any computer readable medium, such as storage 120, for use by or in connection with any computer related system or method. In the context of this document, a computer readable medium is an electronic, magnetic, optical, or other physical device or means that can contain or store a computer program for use by or in connection with a computer related system or method. The message transformation replication methods described herein can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In exemplary embodiments, a "computer-readable medium" can be any means that can store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection (electronic) having one or more wires, a portable computer diskette (magnetic), a random access memory (RAM) (electronic), a read-only memory (ROM) (electronic), an erasable programmable read-only memory (EPROM, EEPROM, or Flash memory) (electronic), an optical fiber (optical), and a portable compact disc read-only memory (CDROM) (optical). Note that the computer-readable medium could even be paper or another suitable medium upon which the program is printed, as the program can be electronically captured, via for instance optical scanning of the paper or other medium, then compiled, interpreted or otherwise processed in a suitable manner if necessary, and then stored in a computer memory.

In exemplary embodiments, where the message transformation replication methods are implemented in hardware, the message transformation replication methods described herein can be implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

The capabilities of the present invention can be implemented in software, firmware, hardware or some combination thereof.

As one example, one or more aspects of the present invention can be included in an article of manufacture (e.g., one or more computer program products) having, for instance, computer usable media. The media has embodied therein, for instance, computer readable program code means for providing and facilitating the capabilities of the present invention. The article of manufacture can be included as a part of a computer system or sold separately.

Additionally, at least one program storage device readable by a machine, tangibly embodying at least one program of instructions executable by the machine to perform the capabilities of the present invention can be provided.

The flow diagrams depicted herein are just examples. There may be many variations to these diagrams or the steps (or operations) described therein without departing from the spirit of the invention. For instance, the steps may be performed in a differing order, or steps may be added, deleted or modified. All of these variations are considered a part of the claimed invention.

While the preferred embodiment to the invention has been described, it will be understood that those skilled in the art, both now and in the future, may make various improvements and enhancements which fall within the scope of the claims which follow. These claims should be construed to maintain the proper protection for the invention first described.

What is claimed is:

1. In a computer system having a processor, a method for placing a message transformation graph onto an overlay network of broker machines, to optimize a given objective function, the method consisting of:
    receiving in the processor an initial message transformation graph, a network topology, and expected performance properties of the initial message transformation graph and of network nodes and links, and a designation of particular stateless transformations in the transformation graph as being replicable;
    running in the processor a placement algorithm without replicating any transformations to determine a set of task-to-broker assignments with respect to the given objective function, including end-to-end latency;
    setting a hash map value to empty;
    until the objective function improvement drops below a designated threshold, repeat an improvement step in the processor consisting of the following sub-steps:
        identifying a replicable transformation which forms the performance bottleneck, and designating the replicable transformation as a sensitive transformation for this step;
        augmenting the transformation graph by replicating the sensitive transformation;
        finding a best load distribution among the sensitive transformation's replicas such that the load distributions from the previous run of the placement algorithm are feasible solutions for a next run;
        deriving a set of starting points from the task-to-broker assignments achieved from a previous run of the placement algorithm;
        re-executing the placement algorithm on the augmented graph, starting the search from the above derived starting points to determine a new set of task-to-broker assignments; and
    determining a final optimal task-to-broker assignment from the task-to-broker assignments
        storing a number of replicas and load distribution information for the replica transformation in the hash map.

2. The method as claimed in claim 1 wherein the best load distribution among the sensitive transformation's replicas is determined based on a calculated normalized coverage capability of each possible data distribution.

3. The method as claimed in claim 1 wherein each of the set of starting points derived from the task-to-broker assignments achieved from a previous run of the placement algorithm is further perturbed by R times, so as to further expand a potential solution space of a next round of placement.

4. The method as claimed in claim 1 wherein the replication of the sensitive transformation involves the replication of children nodes of the sensitive transformation in the transformation graph.

5. The method as claimed in claim 1 wherein the sensitive transformation is replicated in a constrained path replication manner when the sensitive transformation has multiple parent nodes in the transformation graph.

* * * * *